United States Patent Office 3,172,873
Patented Mar. 9, 1965

3,172,873
PROCESS FOR THE MANUFACTURE OF HIGH-MOLECULAR LINEAR COPOLYESTERS
Wolfgang Griehl and Hans Luckert, both of Chur, Switzerland, assignors to Inventa A.G. für Forschung und Patentverwertung, Zurich, Switzerland
No Drawing. Filed Dec. 5, 1961, Ser. No. 157,258
Claims priority, application Switzerland, Mar. 8, 1958, 56,801; Dec. 6, 1960, 13,656/60
4 Claims. (Cl. 260—47)

The invention relates to the manufacture of copolyesters and, particularly, to the manufacture of such resins having high molecular weight. It is a continuation-in-part to our copending application Ser. No. 797,589, filed March 6, 1959.

It has been suggested in the above-named application to produce linear copolyesters of carbonic acid which are film- and fiber formers and of high melting point, by reaction of p.p'-dihydroxy esters of aliphatic or cycloaliphatic diols and aromatic oxycarboxylic acids with phosgene. The reaction with phosgene can be carried out in a number of different ways. For instance, the alkali salts of the p.p'-dihydroxy esters can be reacted in aqueous solution with phosgene in the presence of an inert organic solvent. Also, the polyesters can be prepared by introducing phosgene or a phosgene solution into solutions of the dioxy compounds named in organic tertiary bases, especially in pyridine. A further possibility consists of the conversion of the dioxy esters, in the form of their bischlorocarbonic acid esters, either by reaction with equimolar amounts of dioxy ester with addition of an acid former, e.g., pyridine, or with equimolar amounts of the alkali salts of the dioxy esters, into polymeric resins.

Polymers thus produced have comparatively low molecular weights, so that fibers, foils or films manufactured therefrom lack sufficient strength properties. Moreover, melt spinning of products having such low molecular weights meets with considerable difficulties due to the low melt viscosities.

It now has been found that polyester resins having sufficiently high molecular weight can be formed from the dihydroxy esters and phosgene, when particular reaction conditions are maintained.

The object of the invention, hence, is a process for the manufacture of high-molecular copolyesters of carbonic acid by the reaction of diesters of aromatic oxycarboxylic acids and diols with phosgene in alkaline medium. This process has as its salient feature that an excess of phosgene is employed, with respect to the p,p'-dioxy ester used, and that the alkali required for the neutralization of the excess phosgene is entered in the reaction gradually during the reaction.

Unexpectedly, it has been found that the employment of equimolar amounts of phosgene does not suffice to attain the desired high molecular weight in the end product, but that an excess phosgene of 10 to 40 percent above the theoretically required quantity must be used. This mode of operation has been particularly successful in the production of polyester carbonates by introduction of phosgene into the aqueous solution of the alkali salts of aromatic 4.4'-dioxy esters. The addition of smaller amounts of organic solvents, such as acetylene tetrachloride, methylene chloride, xylene or chloroform, which are capable of swelling or dissolving the copolyesters according to the invention, favorably influences the reaction with phosgene.

It is of advantage not to add the amount of alkali required for the neutralization of the excess phosgene at the start of the reaction because, in that case, a partial saponification of the 4.4'-dihydroxy esters sets in even at comparatively low reaction temperatures, so that aromatic oxycarboxylic acids form which act as chain stoppers and thus prevent further condensation to polymers of sufficiently high molecular weight. This can be avoided by first dissolving the aromatic dihydroxy esters in an equimolar amount aqueous alkali solution to a clear solution and dropping the remaining alkali solution into the mixture during the phosgene reaction with intensive mechanical agitation. The alkali addition is to be regulated in such a manner that the mixture, at all times, reacts alkaline, but not too highly alkaline.

It furthermore has been found that polymers having high molecular weight can be obtained while simultaneously considerably shortening the time of the phosgene reaction, when quaternary ammonium compounds or tertiary bases, in amounts of 0.1 to 8 percent by weight, calculated on the dihydroxy esters present, are entered in the reaction. These compounds may be added prior to, during, or even after addition of the total phosgene. However, it has been found that it is more advantageous to introduce these catalysts, i.e., the quaternary ammonium compounds or tertiary bases, prior to or during the introduction of the phosgene.

As representative examples for these catalysts, the following are named: tetraethyl- and tetramethyl ammonium hydroxide, benzyl triethyl ammonium bromide, 4-styryl-benzyl dimethylammonium bromide, dimethyl pyrrolidinium chloride, dimethyl benzyl amine, triethyl amine, n-methylpyrrolidine, pyridine and diethyl aniline.

As the acid components of the aromatic dioxyesters to be used for the formation of the copolyester carbonates according to the instant invention, the aromatic hydroxycarboxylic acids named in our co-pending application Ser. No. 797,589 can be used. Aside from the unsubstituted p-hydroxybenzoic acid, p-hydroxybenzoic acids substituted at the aromatic nucleus, which substituents are incapable of reacting during the polycondensation, can be employed. 4-oxy-3-chlorobenzoic acid, 4-oxy-3-methylbenzoic acid, 4-hydroxy-3.5-dimethoxybenzoic acid and, especially, vanillic acid are usable. The latter is readily produced on a large scale. The following aliphatic and cycloaliphatic diols can be employed for the production of the dihydroxyesters: ethylene glycol; diethylene glycol; triethylene glycol; thiodiglycol; propanediol-1.3; butanediol-1.4; pentanediol-1.5; hexanediol-1.6; 2-ethylpropanediol-1.3; quinitol and p-xylenediol, and others.

The invention now will be further explained by a number of examples. However, it should be understood that these are given merely by way of illustration, not of limitation, and that numerous changes may be made in the details without departing from the spirit and the scope of the invention as hereinafter claimed.

*Example 1*

19.2 grams (g.) ethylene glycol divanillate were dissolved in an aqueous solution of 4.3 g. NaOH in 50 g. water at room temperature. 50 g. acetylene tetrachloride and 0.5 g. tetraethyl ammonium bromide were added thereto, and then 5 g. phosgene were passed into the mixture at a temperature of 25-27° C. within one hour with vigorous agitation. Thereafter, another 2.8 g. phosgene were introduced within 30 minutes, and simultaneously 4.8 g. NaOH, dissolved in 25 g. water, were dropped into the solution. The reaction mixture was agitated for another hour at approximately 30° C. the highly viscous organic mass formed then was separated and repeatedly washed with water. By addition of boiling methanol, the copolyester was obtained as a fully colorless grainy mass. It melted at 170–175° C. to a highly viscous melt. A one-percent solution in acetylene tetrachloride had a solution viscosity of 1.32. The polyester resin could be fabricated from the melt or from solution into fibers, foils, films, and the like. These materials could be stretched to a multiple of their original lengths. Shaped bodies having excellent technical properties were obtained, e.g., high strength properties, low stress and low water acceptability.

*Example 2*

In a solution of 4.9 g. NaOH in 80 g. water, 18.05 g. pure ethylene glycol di-p-hydroxybenzoate were dissolved at room temperature. The entirely clear solution, together with 50 g. methylene chloride and 60 g. acetylene tetrachloride, was entered in a three-neck flask of 500 ml. capacity. 0.8 g. benzyltrimethyl ammonium chloride were added thereto, and 4 g. phosgene were introduced at a temperature of 25–30° C. within 45 minutes with vigorous agitation. Thereafter, another 3.7 g. phosgene were introduced at the same temperature and within 30 minutes, while simultaneously dropping in a solution of 3.0 g. NaOH in 30 g. water. The reaction solution then was agitated for one hour at a temperature of 30–35° C. The highly viscous organic phase then was separated, repeatedly washed with water, and the polymer precipitated by the addition of alcohol. The colorless grainy product thus obtained, after washing and drying, had a melting point of 235–240° C., and a one-percent solution in acetylene tetrachloride had a relative viscosity of 1.28. The copolyester thus formed could be fabricated from the melt or from solution into shaped bodies and was particularly suited for the manufacture of films, foils and fibres.

We claim as our invention:

1. In a process for the manufacture of high-molecular linear polycarbonate polyesters by the polycondensation reaction of dioxydiesters of aromatic monohydroxy monocarboxylic acids and alcohols, selected from the group consisting of aliphatic diols and cycloaliphatic diols, with phosgene in an aqueous alkaline medium substantially at room temperature, the steps which comprise dissolving said esters in an equimolar amount of aqueous alkali solution; introducing phosgene in an excess of 10–40 percent over the amount theoretically required for the reaction; and neutralizing said excess during the reaction by dropwise addition of further aqueous alkali solution, maintaining alkalinity of the reaction mixture throughout the polycondensation.

2. In a process for the manufacture of high-molecular linear polycarbonate polyesters by the polycondensation reaction of dioxydiesters of aromatic monohydroxy monocarboxylic acids and alcohols, selected from the group consisting of aliphatic diols and cycloaliphatic diols, with phosgene in an aqueous alkaline medium substantially at room temperature, the steps which comprise dissolving said esters in an equimolar amount of aqueous alkali solution; introducing phosgene in an excess of 10–40 percent over the amount theoretically required for the reaction; and neutralizing said excess during the reaction by dropwise addition of further aqueous alkali solution, maintaining alkalinity of the reaction mixture throughout the polycondensation; carrying out said reaction in the presence of 0.1 to 8 percent by weight, calculated on the dioxydiester, of a catalyst selected from the group consisting of quaternary ammonium compounds and tertiary amine bases.

3. In a process for the manufacture of high-molecular linear polycarbonate polyesters prepared by the polycondensation reaction of aromatic 4.4-dioxydiesters of an alcohol selected from the group consisting of aliphatic diols and cycloaliphatic diols and acids selected from the group consisting of vanillic acid, p-hydroxybenzoic acid, 4-oxy-3-chlorobenzoic acid, 4-oxy-3-methylbenzoic acid, and 4-hydroxy-3.5-dimethoxybenzoic acid, with phosgene in an aqueous alkaline medium substantially at room temperature, the steps which comprise dissolving said esters in an equimolar amount of aqueous alkali solution; introducing phosgene in an excess of 10–40 percent over the amount theoretically required for the reaction; and neutralizing said excess by dropwise addition of further aqueous alkali solution, maintaining alkalinity of the reaction mixture throughout the polycondensation.

4. In a process for the manufacture of high-molecular linear polycarbonate polyesters prepared by the polycondensation reaction of aromatic 4.4-dioxydiesters of an alcohol selected from the group consisting of aliphatic diols and cycloaliphatic diols and acids selected from the group consisting of vanillic acid, p-hydroxybenzoic acid, 4-oxy-3-chlorobenzoic acid, 4-oxy-3-methylbenzoic acid, and 4-hydroxy-3.5-dimethoxybenzoic acid, with phosgene in an aqueous alkaline medium substantially at room temperature, the steps which comprise dissolving said esters in an equimolar amount of aqueous alkali solution; introducing phosgene in an excess of 10–40 percent over the amount theoretically required for the reaction; and neutralizing said excess by dropwise addition of further aqueous alkali solution, maintaining alkalinity of the reaction mixture throughout the polycondensation, carrying out said reaction in the presence of 0.1 to 8 percent by weight, calculated on the dioxydiester, of a catalyst selected from the group consisting of quaternary ammonium compounds and tertiary amine bases.

References Cited in the file of this patent

UNITED STATES PATENTS

| | | |
|---|---|---|
| 2,964,797 | Peilstöcker | Dec. 20, 1960 |
| 2,970,131 | Moyer | Jan. 31, 1961 |
| 3,030,331 | Goldberg | Apr. 17, 1962 |